(12) United States Patent
Ang et al.

(10) Patent No.: US 7,945,436 B2
(45) Date of Patent: May 17, 2011

(54) PASS-THROUGH AND EMULATION IN A VIRTUAL MACHINE ENVIRONMENT

(75) Inventors: Boon Seong Ang, Sunnyvale, CA (US); Mallik Mahalingam, Sunnyvale, CA (US); Ronghua Zhang, Mountain View, CA (US); Andrew Lambeth, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 95 days.

(21) Appl. No.: 12/179,402

(22) Filed: Jul. 24, 2008

(65) Prior Publication Data

US 2009/0119087 A1    May 7, 2009

Related U.S. Application Data

(60) Provisional application No. 61/002,175, filed on Nov. 6, 2007.

(51) Int. Cl.
*G06F 9/455* (2006.01)
(52) U.S. Cl. .......................................... 703/23
(58) Field of Classification Search .................. 703/22, 703/23; 717/134, 138
See application file for complete search history.

(56) References Cited

U.S. PATENT DOCUMENTS

| | | | | |
|---|---|---|---|---|
| 6,980,946 | B2 * | 12/2005 | Giles et al. ...................... | 703/22 |
| 7,260,815 | B1 * | 8/2007 | Chen et al. ..................... | 717/134 |
| 2004/0186837 | A1 * | 9/2004 | Lambert et al. ................. | 707/10 |
| 2004/0210911 | A1 * | 10/2004 | Bodin et al. ................... | 719/321 |

OTHER PUBLICATIONS

3rd pty ids (Tim Abels et al., "An Overview of Xen Virtualization;"; Aug. 5).*

* cited by examiner

*Primary Examiner* — Albert Decady
*Assistant Examiner* — Andre Pierre Louis

(57) ABSTRACT

A virtual device emulated in software and included in a virtual machine is provided in a virtualized computer system. The virtual device includes an emulation mode and a pass through mode. The emulation mode is used for a first plurality of device operations. The pass through mode is used for a second plurality of device operations. The virtual device is configured to communicate with a physical device and each of the second plurality of device operations are configured to be handled by the physical device. The virtual device also includes a switching logic to switch between the emulation mode and the pass through mode based on a device operation to be performed by the virtual machine of the virtual device.

18 Claims, 6 Drawing Sheets

PASS-THROUGH AND EMULATION IN A VIRTUAL MACHINE ENVIRONMENT

This application claims the benefit of U.S. Provisional Application No. 61/002,175, filed on Nov. 6, 2007, which provisional application is incorporated herein by reference in its entirety.

CROSS REFERENCE TO RELATED APPLICATION(S)

This application is related to U.S. patent application Ser. No. 12/124,893 by M. Mahalingam et al., filed on May 21, 2008, entitled "Handling Interrupts When Virtual Machines of a Virtualized Computer System Have Direct Access to a Hardware Device," and U.S. patent application Ser. No. 12/124,586 by M. Mahalingam et al., filed on May 21, 2008, entitled "Providing Virtual Machines of a Virtualized Computer System with Direct Access to a Hardware Device," both of which are assigned to the assignee of the present application, and both of which are hereby incorporated by reference in their entirety.

BACKGROUND

Virtualization environments provide multiple virtual machines (VMs) on a physical machine, with each VM looking like a full computer to "guest" software running inside the VM. This enables a user to concurrently run multiple copies of a guest operating system on one physical machine, with each guest operating system having its own copy of "virtual hardware."

Many of today's virtualization environments support VM input/output (I/O) operations by providing virtual I/O devices that are emulated in software. This I/O virtualization approach has many advantages, including insulating the guest operating system from the specifics of physical hardware on which it is running. This insulation in turn simplifies the task of moving a VM from one physical server to another, a process referred to herein as "VM migration." Such moves can occur "cold," i.e., when the VM is not booted up; "warm," i.e., when the VM is suspended and then resumed; or "hot," i.e., when the VM is running and continues to run while it is moved from one physical server to another. With emulated virtual I/O devices, the emulated virtual I/O devices can run on any physical server, independent of the specifics of the physical I/O device. As such, a migrating VM continues to see the same set of virtual I/O devices across the migration. In essence, virtual I/O devices provide uniformity, with an emulation layer masking diversity at the level of physical I/O devices.

Another approach to providing VMs with I/O is to expose a subset of a physical machine's I/O infrastructure to each VM. The exposed physical I/O devices are then directly accessed by a guest device driver, e.g., software running inside the VM. This approach is referred to herein as "guest device pass-through" or simply "pass-through." There are a number of benefits to guest device pass-through, one of which is better performance. I/O operations from within a VM are likely to be faster with pass-through I/O devices then with emulated virtual I/O devices.

The pass-through I/O virtualization approach, however, makes it difficult to migrate VMs from one physical machine to another in a transparent manner, because the specificity of physical I/O devices on the physical server is now exposed to guest software.

SUMMARY

In one embodiment, a virtual device emulated in software and included in a virtual machine is provided in a virtualized computer system. The virtual device includes an emulation mode and a pass-through mode. The emulation mode is used for a first plurality of device operations. The pass-through mode is used for a second plurality of device operations. The virtual device is configured to communicate with a physical device and each of the second plurality of device operations are configured to be handled by the physical device. The virtual device also includes a switching logic to switch between the emulation mode and the pass-through mode based on a device operation to be performed by the virtual machine of the virtual device.

In another embodiment, a method of providing a virtual machine in a virtualized computer system with a virtual device is disclosed that includes providing an emulation mode and a pass-through mode. The emulation mode is used for a first plurality of device operations, and the pass through mode is used for a second plurality of device operations. The method further includes switching between the emulation mode and the pass-through mode based on a device operation being performed by the virtual machine of the virtual device where the virtual device is emulated in software.

DETAILED DESCRIPTION

As used in the discussion below, a "virtual device" is a device seen by guest software that can be implemented as a mix of a software-emulated device and a pass-through device. The type of virtual device implementation is referred to herein as a "backend." A virtual device implementation (or backend) can be switched between a completely software-emulated device and a partially or fully pass-through device. The term "pass-through device," unless otherwise qualified, is used herein to refer to either a partially pass-through device (e.g., a hybrid implementation) or a fully pass-through device.

Figure 1:
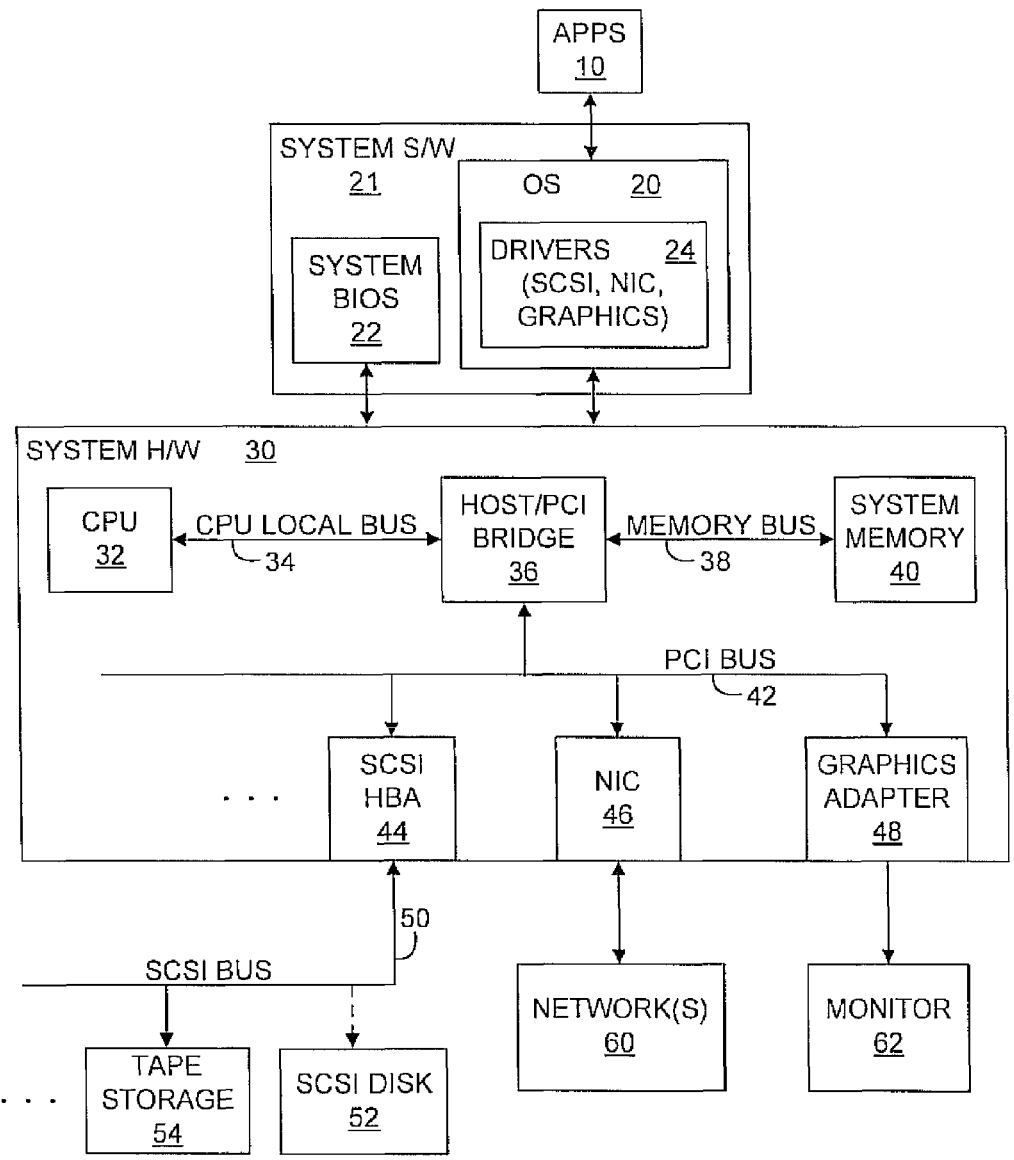
FIG. 1 is a block diagram of a general, non-virtualized computer system upon which embodiments in accordance with the invention are implemented.

FIG. 1 illustrates a general computer system that forms the basis for the exemplary embodiment described below. The general computer system comprises system hardware 30 (which may be a conventional computer system, such as a personal computer), and system hardware 30 may include conventional components, such as one or more processors, a system memory, and a local disk. System memory is typically some form of high-speed random access memory (RAM), whereas the disk (one or more) is typically a non-volatile, mass storage device. System hardware 30 may also include other conventional mechanisms such as a memory management unit (MMU), various registers and various input/output (I/O) devices.

Specifically, FIG. 1 shows that system hardware 30 includes processor (i.e., a CPU or central processing unit) 32, host/PCI bridge 36, system memory 40, SCSI HBA 44, network interface card or controller (NIC) 46, and graphics adapter 48. Processor 32 is connected to host/PCI bridge 36 by CPU local bus 34 in a conventional manner; system memory 40 is connected to host/PCI bridge 36 by memory bus 38 in a conventional manner; and SCSI HBA 44, NIC 46 and graphics adapter 48 are connected to host/PCI bridge 36 by PCI bus 42 in a conventional manner. Further, FIG. 1 shows that graphics adapter 48 is connected to conventional video monitor 62 in a conventional manner; NIC 46 is connected to one or more conventional data networks 60 in a conventional manner (networks 60 may be based on Ethernet technology, and the networks may use, for example, the Transmission Control Protocol/Internet Protocol (TCP/IP)). Still further, SCSI HBA 44 supports SCSI bus 50 in a conventional manner, and various devices may be connected to SCSI bus 50, in a conventional manner. For example, FIG. 1 shows SCSI disk 52 and tape storage device 54 connected to SCSI bus 50. Other devices may also be connected to SCSI bus 50.

Computer systems generally have system level software and application software executing on the system hardware. Thus, FIG. 1 shows system software 21 executing on system hardware 30. System software 21 is shown as including operating system (OS) 20 and system BIOS (Basic Input/Output System) 22, although other system level software configurations are also possible. OS 20 may be a conventional OS for system hardware 30. Further, OS 20 may include a set of drivers 24, some of which may be packaged with OS 20, and some of which may be separately loaded onto system hardware 30. Drivers 24 may provide a variety of functions, including supporting interfaces with SCSI HBA 44, NIC 46 and graphics adapter 48. Drivers 24 may also be conventional for system hardware 30 and OS 20. System BIOS 22 may also be conventional for system hardware 30. Finally, FIG. 1 shows a set of one or more applications 10 executing on system hardware 30. Applications 10 may also be conventional for system hardware 30 and OS 20.

The computer system of FIG. 1 may be initialized in a conventional manner. Thus, when the computer system is powered up or restarted, system BIOS 22 and/or OS 20, or, more generally, system software 21, may detect and configure various aspects of system hardware 30 in a conventional manner. For example, system software 21 may detect and configure devices on PCI bus 42 in a conventional manner, including, in particular, SCSI HBA 44.

If a PCI device implements an extended read only memory (ROM), which may also be referred to as a device ROM or option ROM, then system software 21 typically copies a code image from a ROM on the PCI device into RAM memory 40 within system hardware 30. An initialization module within the code image is typically executed as part of an initialization process, which initialization process may further initialize the PCI device and/or other devices connected to the PCI device. Referring again to FIG. 1, during the initialization process, system software 21 attempts to access configuration registers of PCI devices at each possible location on PCI bus 42 and detects graphics adapter 48, NIC 46 and SCSI HBA 44. System software 21 determines the functions implemented in each of these devices, along with other relevant information, and initializes each of the devices appropriately. SCSI HBA 44 typically includes an extended ROM which contains an initialization module that, when executed, initializes SCSI bus 50 and devices connected to SCSI bus 50, including SCSI disk 52 and tape storage device 54. The initialization of PCI bus 42; the devices connected to PCI bus 42, including graphics adapter 48, NIC 46, and SCSI HBA 44; SCSI bus 50; and the devices connected to SCSI bus 50, including SCSI disk 52 and tape storage device 54, may all be performed in a conventional manner.

After the computer system of FIG. 1 is initialized, including the devices on PCI bus 42, the configuration registers in the respective PCI devices may be accessed on an ongoing basis to interact with the PCI devices and to utilize the functions implemented by the PCI devices. In particular, configuration registers in SCSI HBA 44 may be accessed to determine which SCSI HBA is connected to PCI bus 42, to determine characteristics of the devices connected to PCI bus 42, and to interface with the devices on SCSI bus 50, all in a conventional manner.

Also, after the computer system of FIG. 1 is initialized, software executing on system hardware 30 may perform I/O transfers to and from devices on PCI bus 42, namely I/O writes to devices on PCI bus 42 and I/O reads from devices on PCI bus 42. These I/O transfers are performed in a conventional manner using memory regions and/or I/O regions specified in Base Address registers of a PCI device. These I/O transfers may be DMA (direct memory access) transfers from the devices or they may be non-DMA transfers. In the case of SCSI HBA 44, software executing on system hardware 30 may perform I/O transfers to and from devices on SCSI bus 50, through SCSI HBA 44, in a convention manner. For example, such I/O transfers through SCSI HBA 44 may be used to write data to SCSI disk 52 or to read data from SCSI disk 52, both in a conventional manner.

I/O transfers to and from PCI devices may be further broken down into (a) transactions initiated by CPU 32 and (b) transactions initiated by the PCI devices. Non-DMA I/O transfers involve only CPU-initiated transfers. For a non-DMA write, CPU 32 initiates the transfer, writes data to the PCI device, and the PCI device receives the data, all in the same transaction. For a non-DMA read, CPU 32 initiates the transfer and the PCI device retrieves the data and provides it to CPU 32, again all in the same transaction. Thus, non-DMA I/O transfers may be considered simple CPU accesses to the PCI devices.

DMA I/O transfers, in contrast, involve transactions initiated by the PCI devices. For a DMA write transfer, CPU 32 first writes data to a memory region without any involvement by a PCI device. CPU 32 then initiates the DMA transfer in a first transaction, involving a CPU access to the PCI device. Subsequently, the PCI device reads the data from the memory region in a second transaction. This second transaction may be considered a "DMA operation" by the PCI device.

For a DMA read operation, CPU 32 initiates the DMA transfer in a first transaction involving a CPU access to the PCI device. The PCI device then retrieves the data and writes it into a memory region in a second transaction, which may also be considered a "DMA operation" by the PCI device. Next, CPU 32 reads the data from the memory region without any further involvement by the PCI device. Thus, DMA I/O transfers to and from a PCI device generally involves both a CPU access to the PCI device and a DMA operation by the PCI device.

In addition to accesses to configuration registers of PCI devices and I/O transfers to and from PCI devices, PCI devices also typically generate interrupts to CPU 32 for various reasons, such as upon completion of a DMA transfer. Such interrupts may be generated and handled in a conventional manner.

In summary, there are four general types of transactions that occur between CPU 32 and a PCI device, such as SCSI HBA 44. A first transaction type (a "configuration transaction") involves an access by CPU 32 to configuration registers of the PCI device, such as PCI configuration registers 45 of SCSI HBA 44. A second transaction type (an "I/O transaction") involves an access by CPU 32 to the PCI device, through memory and/or I/O region(s) specified by Base Address registers of the PCI device. A third transaction type (a "DMA operation") involves a DMA operation by the PCI device, which involves a read from or a write to a memory region specified by a Base Address register of the PCI device. A fourth transaction type (an "interrupt") involves an interrupt from the PCI device to CPU 32, such as upon completion of a DMA transfer.

Figure 2A:
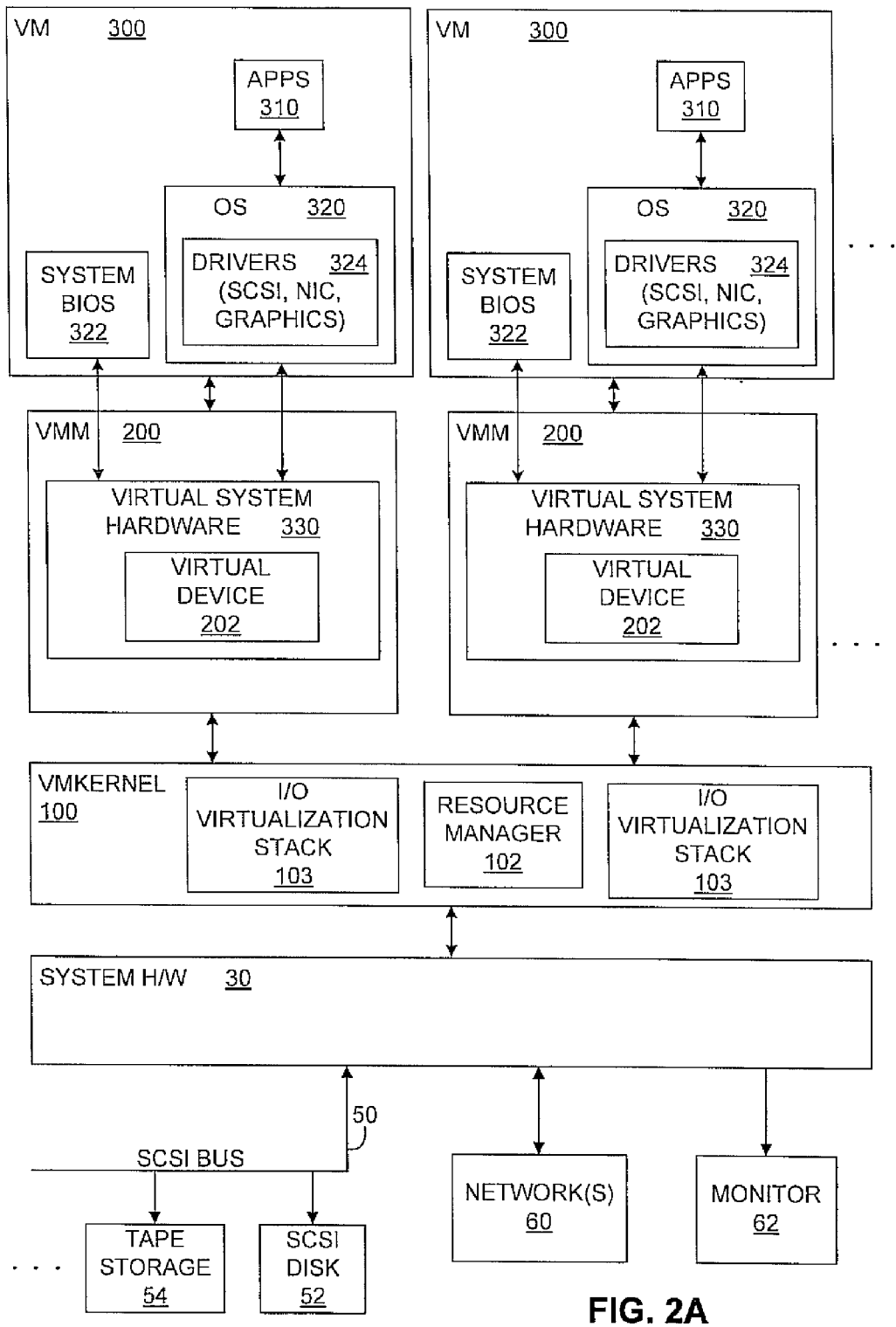
FIG. 2A is a block diagram of a general, kernel-based, virtual computer system according to one or more embodiments of the present invention.

FIG. 2A shows an embodiment of a computer system that implements virtualization. One or more VMs 300, or "guests," are installed on a "host platform," or simply "host," which will include system hardware, and one or more layers or co-resident components comprising system-level software, such as an operating system or similar kernel, or a virtual machine monitor or hypervisor (see below), or some combination of these. The system hardware typically includes one or more processors, memory, some form of mass storage, and various other devices.

The computer system of FIG. 2A is shown as having the same system hardware 30 as that shown in FIG. 1, and as was described above. Thus, system hardware 30 of FIG. 2A also includes CPU 32, host/PCI bridge 36, system memory 40, SCSI HBA 44, NIC 46, and graphics adapter 48 of FIG. 1, although these devices are not illustrated in FIG. 2A for simplicity. As is also illustrated in FIG. 1, but not in FIG. 2A, CPU 32 is connected to host/PCI bridge 36 by CPU local bus 34 in a conventional manner; system memory 40 is connected to host/PCI bridge 36 by memory bus 38 in a conventional manner; and SCSI HBA 44, NIC 46 and graphics adapter 48 are connected to host/PCI bridge 36 by PCI bus 42 in a conventional manner.

FIG. 2A also shows the same video monitor 62, the same networks 60 and the same SCSI bus 50 as are shown in FIG. 1, along with the same SCSI disk 52 and the same tape storage device 54, which are again shown as being connected to the SCSI bus 50. Other devices may also be connected to SCSI bus 50. Thus, graphics adapter 48 (not shown in FIG. 2A) is connected to video monitor 62 in a conventional manner; NIC 46 (not shown in FIG. 2A) is connected to data networks 60 in a conventional manner; and SCSI HBA 44 (not shown in FIG. 2A) supports SCSI bus 50 in a conventional manner.

As indicated in FIG. 2A, guest system software runs on VMs 300. VMs 300 are managed by a VMM 200. VMM 200 typically includes virtual system hardware 330. Virtual system hardware 330 typically includes at least one virtual CPU, some virtual memory, and one or more virtual devices. All of the virtual hardware components of the VM may be implemented in software using known techniques to emulate the corresponding physical components.

Figure 2B:
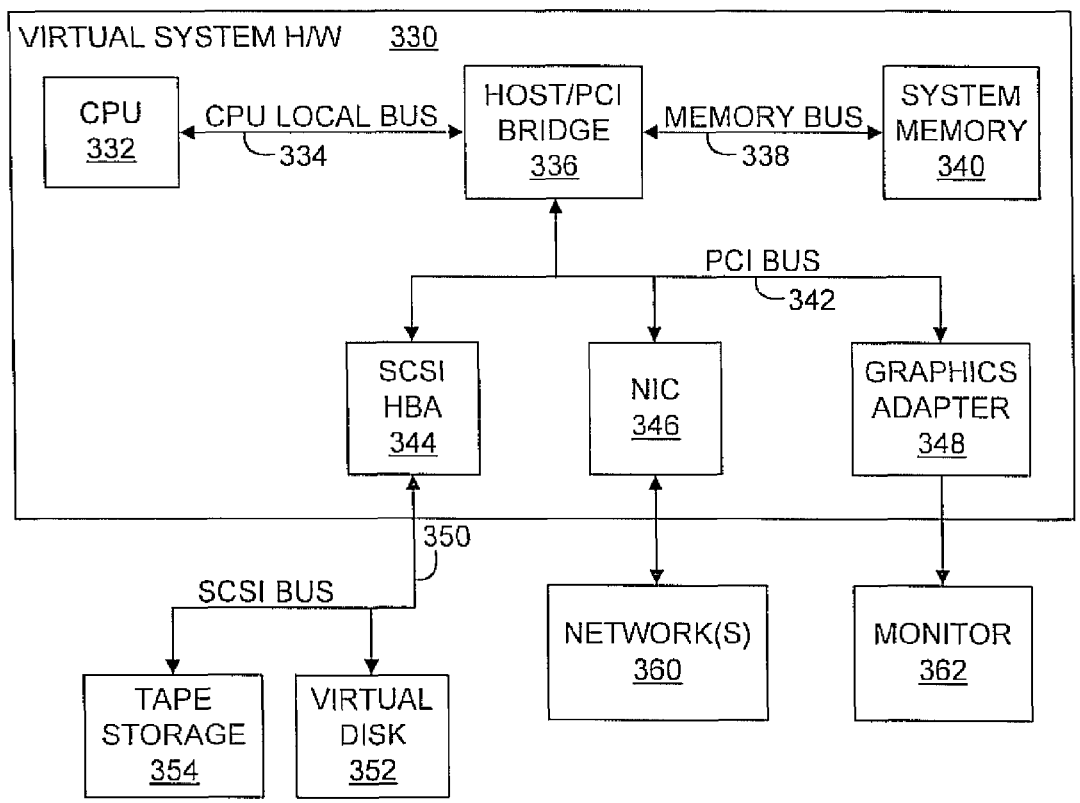
FIG. 2B is a block diagram of virtual system hardware for the virtual machines of FIG. 2A according to one or more embodiments of the present invention.

Virtual system hardware 330 of FIGS. 2A and 2B is functionally similar to underlying physical system hardware 30, although, for other virtual computer systems, the virtual system hardware may be quite different from the underlying physical system hardware. Thus, as FIG. 2B shows, virtual system hardware 330 includes processor (CPU) 332, host/PCI bridge 336, system memory 340, SCSI HBA 344, NIC 346, and graphics adapter 348, each of which may be implemented as conventional devices, substantially similar to corresponding devices in underlying physical hardware 30. CPU 332 appears to be connected to host/PCI bridge 336 in a conventional manner, as if by CPU local bus 334; system memory 340 appears to be connected to host/PCI bridge 336 in a conventional manner, as if by memory bus 338; and SCSI HBA 344, NIC 346 and graphics adapter 348 appear to be connected to host/PCI bridge 336 in a conventional manner, as if by PCI bus 342.

As FIG. 2B further shows, graphics adapter 348 appears to be connected to conventional video monitor 362 in a conventional manner; NIC 346 appears to be connected to one or more conventional data networks 360 in a conventional manner; SCSI HBA 344 appears to support SCSI bus 350 in a conventional manner; and virtual disk 352 and tape storage device 354 appear to be connected to SCSI bus 350, in a conventional manner. Virtual disk 352 typically represents a portion of SCSI disk 52. It is common for virtualization software to provide guest software within a VM with access to some portion of a SCSI disk, including possibly a complete LUN (logical unit number), multiple complete LUNs, some portion of a LUN, or even some combination of complete and/or partial LUNs. Whatever portion of a SCSI disk that is made available for use by the guest software within the VM, it is often presented to the guest software in the form of one or more complete virtual disks. Methods for virtualizing a portion of a SCSI disk as one or more virtual disks are known in the art. Other than presenting a portion of SCSI disk 52 as a complete virtual disk 352, all of the virtual devices illustrated in FIG. 2B may be emulated in such a manner that they are functionally similar to the corresponding physical devices illustrated in FIG. 1, or the virtual devices may be emulated so as to make them quite different from the underlying physical devices.

The guest system software in VMs 300 of FIG. 2A includes OS 320, including a set of drivers 324, and system BIOS 322. FIG. 2A also shows one or more applications 310 running within VMs 300. OS 320 may be substantially the same as OS 20 of FIG. 1, or it may be substantially different; drivers 324 may be substantially the same as drivers 24 of FIG. 1, or they may be substantially different; system BIOS 322 may be substantially the same as system BIOS 22 of FIG. 1, or it may be substantially different; and applications 310 may be substantially the same as applications 10 of FIG. 1, or they may be substantially different. Also, each of these software units may be substantially the same between different VMs, as suggested in FIG. 2A, or they may be substantially different.

Note that a single VM may be configured with more than one virtualized processor. To permit computer systems to scale to larger numbers of concurrent threads, systems with multiple CPUs have been developed. For example, symmetric multi-processor (SMP) systems are available as extensions of the personal computer (PC) platform and from other vendors. Essentially, an SMP system is a hardware platform that connects multiple processors to a shared main memory and shared I/O devices. Virtual machines may also be configured as SMP VMs. In addition, another multi-CPU configuration is found in a so-called "multi-core" architecture in which more than one physical CPU is fabricated on a single chip, each with its own set of functional units (such as a floating-point unit and an arithmetic/logic unit, ALU), and each of which can execute threads independently. In further addition, in a technique that provides for simultaneous execution of multiple threads (referred to as "simultaneous multi-threading"), more than one logical CPU (hardware thread) operates simultaneously on a single chip, but the logical CPUs flexibly share some resource such as caches, buffers, functional units, etc. Embodiments of the present invention may be used regardless of the type—physical and/or logical—or number of processors included in a VM or in the physical system hardware.

Applications 310 running on the VM function as they would if run on a "real" computer, even though the applications are running at least partially indirectly, that is via guest OS 320 and virtual processor(s). Executable files will be accessed by guest OS 320 from a virtual disk or virtual memory, which will be portions of an actual physical disk or memory, respectively, allocated to that VM. Once an application is installed within the VM, guest OS 320 retrieves files from the virtual disk as if the files had been pre-stored as the result of a conventional installation of the application. The design and operation of virtual machines are well known in the field of computer science.

Some interface is generally required between guest software within a VM and various hardware components and devices in the underlying hardware platform. This interface—which may be referred to generally as "virtualization software"—may include one or more software components and/or layers, possibly including one or more of software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support virtualization. Moreover, in some systems, some virtualization code is included in at least one "superior" VM to facilitate the operations of other VMs. Furthermore, specific software support for VMs may be included in the host OS itself. Embodiments of the present invention described herein may generally be used in virtualized computer systems having any type or configuration of virtualization software.

FIG. 2A shows VMMs 200 that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that embodiments of the present invention can be implemented anywhere within the overall structure of the virtualization software, and even in systems that provide specific hardware support for virtualization.

Various virtualized hardware components may be considered to be part of VMM 200 for the sake of conceptual simplicity. In actuality, these "components" are usually implemented as software emulations by virtual device emulators 202 included in the VMMs. One advantage of such an arrangement is that the VMMs may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, the term para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 2A). In a hosted virtualized computer system, an existing, general-purpose operating system forms a "host" OS that is used to perform certain input/output (I/O) operations, alongside and sometimes at the request of the VMM. The Workstation virtualization product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 2A, in many cases, it may be beneficial to deploy VMMs on top of a software layer—kernel 100 (also referred to as VMKernel 100). This configuration is frequently referred to as being "non-hosted." Compared with a system in which VMMs run directly on the hardware platform, use of a kernel may offer greater modularity and facilitate provision of services that extend across multiple virtual machines. Thus, VMKernel 100 may include resource manager 102, for example, for managing resources across multiple virtual machines. VMkernel 100 may also handle other applications running on it that can be separately scheduled, as well as a console operating system that, in some architectures, is used to boot the system and facilitate certain user interactions with the virtualization software.

Note that VMKernel 100 is not the same as a kernel that will be within guest OS 320—as is well known, every operating system has its own kernel. Note also that VMKernel 100 is part of the "host" platform of the VM/VMM as defined above even though the configuration shown in FIG. 2A is commonly termed "non-hosted"; moreover, VMKernel 100 is part of the host and part of the virtualization software or "hypervisor." The difference in terminology is one of perspective and definitions that are still evolving in the art of virtualization. One example of a non-hosted, virtualized computer system is described in U.S. Pat. No. 6,961,941 (Nelson et al., "Computer Configuration for Resource Management in Systems Including a Virtual Machine," 1 Nov. 2005).

As a generalization, some form of "virtualization software" executes between system hardware 30 and one or more VMs 300. The virtualization software uses the resources of system hardware 30 and emulates virtual system hardware 330. Thus, virtualization software typically comprises one or more device emulators 202, and either includes or executes, in conjunction with, some form of system software for accessing and controlling system hardware 30. The virtualization software may provide full virtualization or partial virtualization. In the non-hosted virtual computer system of FIG. 2A, the virtualization software may be considered to comprise VMMs 200, along with some portions of VMKernel 100, such as one or more software modules that may share physical system resources between multiple VMs. The virtualization software operates in conjunction with system software that is also contained in VMKernel 100. Similarly, in a hosted virtual computer system, the virtualization software may be considered to primarily comprise VMMs 200, which operate in conjunction with system software in the form of the host OS. Various other configurations for virtualization software and system software are also possible.

One or more embodiments of the present invention may be used in both a hosted and/or a non-hosted virtualized computer system, in which the included virtual machine(s) may be fully or para-virtualized, and in which the virtual machine(s) have any number of virtualized processors, which may be of any type (including multi-cored, multi-threaded, or some combination). Further, one or more embodiments of the present invention may also be implemented directly in a computer's primary OS, both where the OS is designed to support virtual machines and where it is not. Moreover, one or more embodiments of the present invention may even be implemented wholly or partially in hardware, for example in processor architectures intended to provide hardware support for virtual machines.

With references to FIGS. 2A and 2B, one of device emulators 202 emulates virtual SCSI HBA 344, using physical SCSI HBA 44 to actually perform data transfers, etc. Thus, for example, if guest software attempts to read data from what it sees as virtual disk 352, SCSI device driver 324 typically interacts with what it sees as SCSI HBA 344 to request the data. Device emulator 202 responds to device driver 324, and causes physical SCSI HBA 44 to read the requested data from an appropriate location within physical SCSI disk 52. Device emulator 202 typically has to translate a SCSI I/O operation initiated by device driver 324 into a corresponding SCSI operation to SCSI HBA 44 and finally onto SCSI disk 52. Methods for emulating disks and SCSI disks, and for translating disk operations during such emulations, are known in the art.

During the operation of VM 300, SCSI driver 324 typically interacts with virtual SCSI HBA 344 just as if it were a real, physical SCSI HBA. At different times, SCSI driver 324 may exercise different functionality of virtual SCSI HBA 344, and so device emulator 202 typically must emulate all the functionality of the virtual SCSI HBA. However, device emulator 202 does not necessarily have to emulate all of the functionality of physical SCSI HBA 44. Virtual SCSI HBA 344 emulated by device emulator 202 may be substantially different from physical SCSI HBA 44. For example, virtual SCSI HBA 344 may be more of a generic SCSI HBA, implementing less functionality than physical SCSI HBA 44. Nonetheless, device emulator 202 typically emulates all the functionality of some SCSI HBA. Thus, for example, SCSI driver 324 may attempt to access the PCI configuration registers of virtual SCSI HBA 344, and device emulator 202 typically must emulate the functionality of the configuration registers.

Figure 3A:
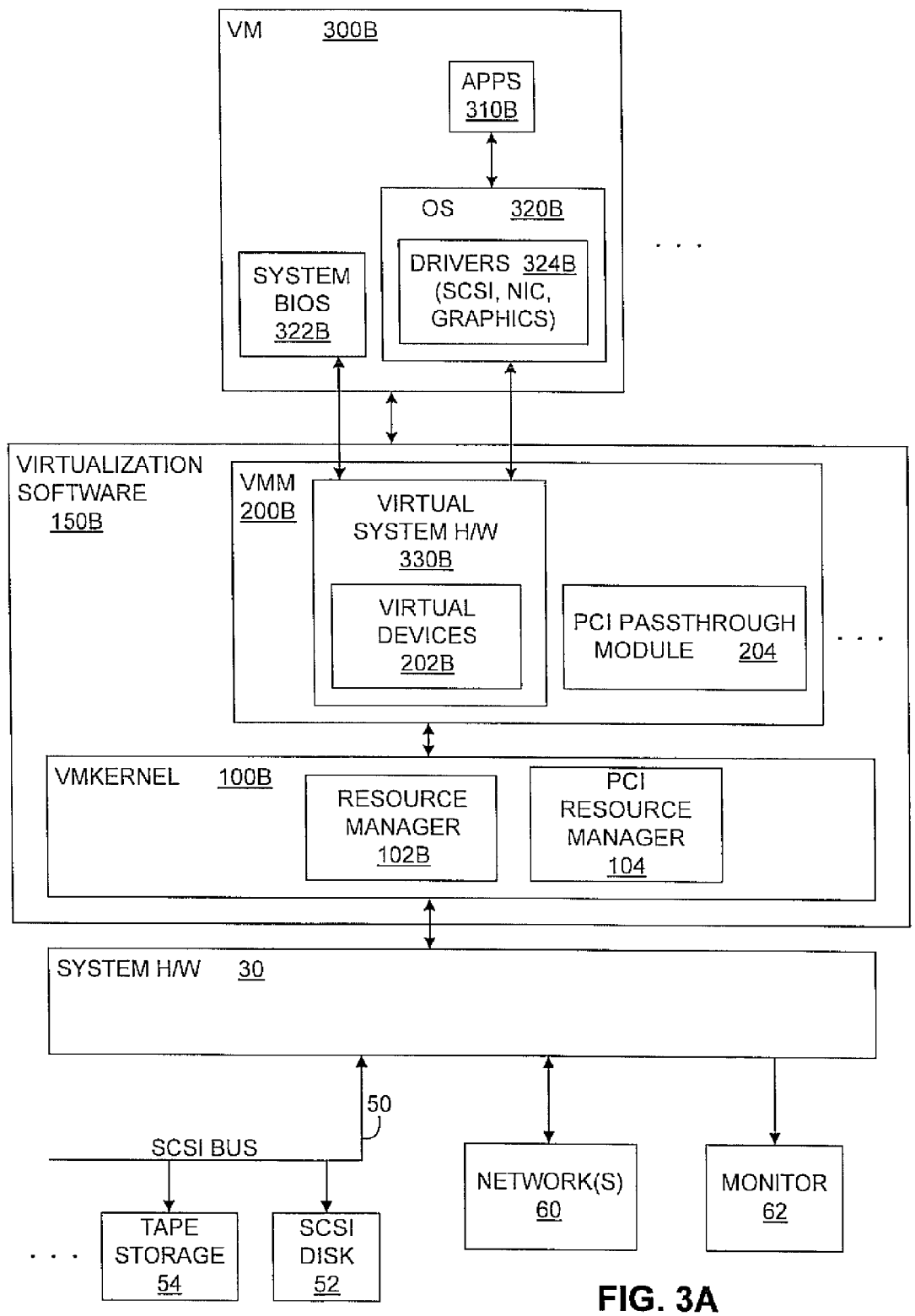
FIG. 3A is a block diagram illustrating an embodiment of the invention in a generalized, kernel-based, virtual computer system.

FIG. 3A illustrates an embodiment of the present invention in a generalized, kernel-based, virtual computer system, in which the physical system hardware includes a PCI bus and a SCSI HBA PCI device, supporting a SCSI bus. The computer system of FIG. 3A is shown as having the same system hardware 30 as is shown in FIGS. 1 and 2A, and as is described above. Thus, system hardware 30 of FIG. 3A also includes CPU 32, host/PCI bridge 36, system memory 40, SCSI HBA 44, NIC 46, and graphics adapter 48 of FIG. 1, although these devices are not illustrated in FIG. 3A for simplicity. As also illustrated in FIG. 1, but not in FIG. 3A, CPU 32 is connected to host/PCI bridge 36 by CPU local bus 34, in a conventional manner; system memory 40 is connected to host/PCI bridge 36 by memory bus 38, in a conventional manner; and SCSI HBA 44, NIC 46 and graphics adapter 48 are connected to host/PCI bridge 36 by PCI bus 42, in a conventional manner. FIG. 3A also shows the same video monitor 62, the same networks 60 and the same SCSI bus 50 as are shown in FIGS. 1 and 2A, along with the same SCSI disk 52 and the same tape storage device 54, which are again shown as being connected to SCSI bus 50. Other devices may also be connected to SCSI bus 50. Thus, graphics adapter 48 (not shown in FIG. 3A) is connected to video monitor 62 in a conventional manner; NIC 46 (not shown in FIG. 3A) is connected to data networks 60 in a conventional manner; and SCSI HBA 44 (not shown in FIG. 3A) supports SCSI bus 50 in a conventional manner.

FIG. 3A shows VMKernel 100B which, except as described below, may be substantially the same as VMKernel 100 of FIG. 2A. Thus, VMKernel 100B includes resource manager 102B, which, except as described below, may be substantially the same as resource manager 102 of FIG. 2A. Note that VMKernel 100B also includes PCI resource manager 104. As will be explained below, PCI resource manager 104 manages the resources of PCI pass-through module 204 (fabricated in accordance with one or more embodiments of the present invention) by creating and managing a configuration register for PCI pass-through devices.

FIG. 3A also shows VMM 200B which, except as described below, may be substantially the same as VMM 200 of FIG. 2A. Thus, VMM 200B includes virtual system hardware 330B which includes a set of virtual devices 202B which, except as described below, may be substantially the same as virtual devices 202 of FIG. 2A. Note that VMM 200B includes PCI pass-through module 204 which is fabricated in accordance with one or more embodiments of the present invention. PCI pass-through module 204 is a software module in VMM 200B which for provides VM 300B with direct access to a corresponding physical hardware device. As will be explained below in more detail, PCI pass-through module 204 causes hardware devices to appear in the virtual PCI bus hierarchy, provides transparent/non-transparent mapping to hardware devices, handles interrupts from pass-through devices, and serves as a conduit for accessing the pass-through devices. As shown in FIG. 3A, VMKernel 100B and VMM 200B may generally be referred to as virtualization software 150B. Such virtualization software may take a wide variety of other forms in other embodiments of the present invention.

FIG. 3A also shows VM 300B which, except as described below, may be substantially the same as VMs 300 of FIG. 2A. Thus, VM 300B includes a set of applications 310B which may be substantially the same as the set of applications 310 of FIG. 2A; OS 320B which may be substantially the same as OS 320 of FIG. 2A; a set of drivers 324B, which may be substantially the same as the set of drivers 320 of FIG. 2A; and system BIOS 322B which may be substantially the same as system BIOS 322 of FIG. 2A. OS 320B, drivers 324B and system BIOS 322B constitute guest system software for VM 300B. PCI pass-through module 204, in collaboration with PCI resource manager 104, maps hardware device resources into a VM's address space so that system software can directly access the hardware device resources. Only a subpart of a hardware device may be mapped into the VM's address space. The atomic granularity at which a portion of a hardware device can be exposed/mapped into a VM is page granularity (e.g., 4 k bytes or 8 k bytes).

Figure 3B:
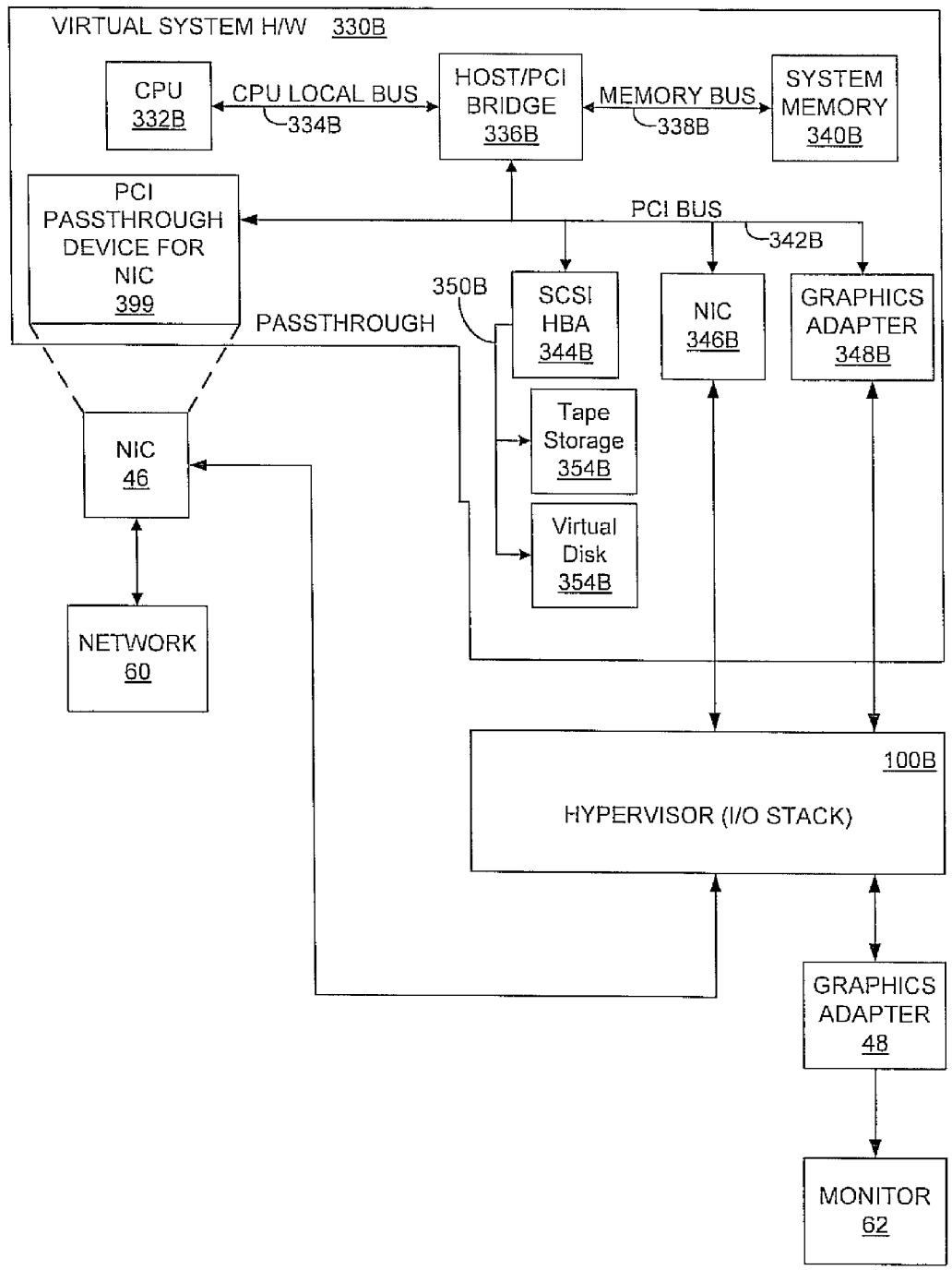
FIG. 3B is a block diagram of virtual system hardware for a virtual machine of FIG. 3A according to one or more embodiments of the present invention.

As also shown in FIG. 3A, VMM 200B includes virtual system hardware 330B which, except as described below, may be substantially the same as virtual system hardware 330 of FIG. 2A. FIG. 3B shows aspects of virtual system hardware 330B that are most relevant to understanding aspects of the present invention. Virtual system hardware 330B of FIGS. 2A and 2B is functionally similar to underlying physical system hardware 30, although, for other virtual computer systems, the virtual system hardware may be quite different from the underlying physical system hardware. Thus, as FIG. 3B shows, virtual system hardware 330B includes processor (CPU) 332B, host/PCI bridge 336B, system memory 340B, NIC 346B, and graphics adapter 348B, each of which may be implemented as conventional devices, substantially similar to the corresponding devices in the underlying physical hardware 30. CPU 332B appears to be connected to host/PCI bridge 336B in a conventional manner, as if by CPU local bus 334B; system memory 340B appears to be connected to host/PCI bridge 336B in a conventional manner, as if by memory bus 338B; and SCSI HBA 344B, NIC 346B and graphics adapter 348B appear to be connected to host/PCI bridge 336B in a conventional manner, as if by PCI bus 342B. SCSI HBA 344B appears to be connected to SCSI bus 350B, tape storage 354B, and virtual disk 352B in a conventional manner.

As shown in FIG. 3B, virtual system hardware 330B includes PCI pass-through device 399 connected to PCI bus 342B. PCI pass-through device 399 in the embodiment illustrated in FIG. 3B is a virtualization of NIC 46, but is virtually connected to virtual PCI bus 342B so that VM 300B can have direct access to NIC 46 through PCI pass-through device 399 as though NIC 46 were directly connected to VM 300B.

To expose a physical hardware device such as NIC 46 to VM 300B, PCI pass-through module 204 obtains actual PCI resource information (for example, vendor identifier, class identifier, subclass, base address register values, real IRQ/vector assigned to the device, etc.) from PCI resource manager 104 for the corresponding physical hardware device (e.g., NIC 46). Once the PCI resource information is obtained, PCI pass-through module 204 sets up virtual PCI device (PCI pass-through device) 399 that contains the configuration information derived from the original physical hardware device (for example, NIC 36). PCI pass-through device 399 is connected to virtual PCI bus 342B that is visible to guest software 320B. As part of setting up PCI pass-through device 399, a callback is registered to handle the PCI configuration cycle, so when guest BIOS 322B or guest OS 320B performs PCI configuration access, PCI pass-through module 204 gets notified.

According to one or more embodiments of the present invention, instead of providing virtual devices that are only emulated in software, virtual devices can switch between emulation and pass-through (that is, from emulation to pass-through, and from pass-through to emulation). For example, infrequent operations can be handled via emulation, but pass-through can be used for frequent, and perhaps, performance critical operations. Other policies can be employed to decide when to use emulation and when to use pass-through. In addition, the virtual device can be exposed first to one physical device then to another physical device such that, in essence, the virtual device is switched from one hardware device to another hardware device, e.g., for failover or load balancing.

Figure 4:
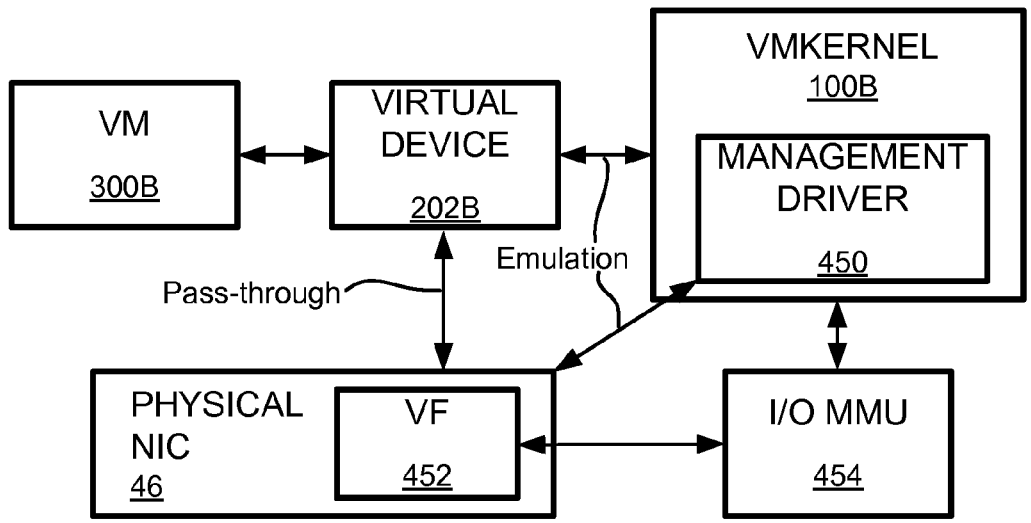
FIG. 4 is a block diagram showing selected elements of the systems of FIGS. 3A and 3B in accordance with one or more embodiments of the present invention.

FIG. 4 is a block diagram showing selected elements of the systems described above. In FIG. 4, a NIC is used as an example of an I/O device; however, further embodiments in accordance with the present invention are not so limited. Generally speaking, embodiments described herein are applicable to any type of device that can be emulated and checkpointed. A "virtual device" (e.g., a virtual NIC) refers to a device that is seen by the appropriate guest driver 324B of FIG. 3A, while a "physical device" refers to an actual hardware device.

In general, current virtualization software implements some functions to enable the sharing of NIC 46 among multiple VMs. Accordingly, the host-side interface of physical NIC 46 is replicated to some degree to present a level of dedicated resources for each VM. Each instance of a replicated host-side interface is referred to herein as a virtual function (VF). Although a single VF interface is shown in FIG. 4, NIC 46 may support multiple VFs. In one embodiment, I/O MMU 454 provides DMA address translation (for many operating systems running on x86 platforms, a guest driver hands guest physical addresses to VFs as DMA addresses; however, guest physical addresses are different from system/host addresses).

In FIG. 4, an emulation path is shown, as well as a pass-through path. In the emulation path, VM 300B (more specifically, the appropriate guest driver 324B interacting with virtual device 202B) accesses the physical hardware (e.g., NIC 46) via VMKernel 100B as previously described herein. In the example of FIG. 4, VMKernel 100B includes management driver 450 that is used by the virtualization layer to manage and configure interface 452 present on NIC 46.

In the pass-through path, VM 300B (the appropriate guest driver 324B and virtual device 202B) accesses the physical hardware (e.g., NIC 46) directly, as exemplified in FIG. 4. With pass-through, software running inside VM 300B can interact directly with physical device hardware through memory-mapped I/O or port I/O operations and/or information passed through shared memory region(s), for example.

VM 300B sees, in essence, a hybrid virtual NIC that is part emulated and part pass-through. In one embodiment, VM 300B runs a standard guest driver that works across physical NICs from different vendors and also works with the emulated version of the hybrid NIC. The standard guest driver can be written to make appropriate hypervisor calls to perform DMA mapping and unmapping to support hypervisor-controlled (and guest software invisible) paging of VM physical memory and copy-on-write sharing of memory between VMs.

In one implementation, certain functionalities (which may be referred to as non-pass-through functionalities) are always emulated, while other functionalities (which may be referred to as pass-through functionalities) may be either emulated or passed through directly to VM 300B—in the pass-through case, the appropriate guest driver 324B and virtual device 202B interact directly with the physical hardware, as mentioned previously herein. Emulation may be used for pass-through functionalities when appropriate hardware is not available. Also, control operations such as setting promiscuous mode are emulated. Pass-through can result in higher performance relative to emulation and so, for example, pass-through functionalities can include those functionalities that are critical to performance. Pass-through may also be used for operations that occur frequently, such as but not limited to: transmit ring/queue manipulations; receive ring/queue manipulations; and interrupt handling.

However, a decision with regard to whether to use emulation or pass-through need not be based on relative criticality of functions. For instance, with reference again to the example of FIG. 4, the emulation path may be used when receiving information via physical NIC 46 because it may be desirable to filter incoming traffic, e.g., for viruses. On an emulation path, the incoming traffic can be appropriately routed to a virus filter. Conversely, when transmitting information via physical NIC 46, outgoing traffic may not need to be scanned for viruses, and so the pass-through path may be used for transmitting.

As another example, emulation can be used in instances in which it is necessary to reconcile available guest device drivers 324B with physical hardware in use. In other words, emulation can be used to implement fixes or work-arounds when there is some degree of incompatibility between a physical device and a guest device driver or virtual device.

In general, a VM hypervisor can be programmed with different policies that provide the basis for deciding when to select either emulation or pass-through. Furthermore, the hypervisor can be programmed with different triggers that identify when a switch from emulation to pass-through, and vice versa, should occur.

While pass-through may be more efficient in some respects than emulation, the "mode" in use by any one of the virtual devices may be transparent to the VM 300B. In actual practice, the hypervisor knows when each virtual device is in pass-through mode so that the virtual device can be switched to emulation mode when necessary or desirable (e.g., for security purposes such as scanning incoming traffic for viruses).

Note that the discussion above does not necessarily mean that the virtual device is operating in either pass-through mode or in emulation mode. Indeed, a virtual device may operate exclusively in one mode or the other. However, a virtual device may in essence be operating concurrently in both modes, with one mode selected for certain functionalities and the other mode selected for certain other functionalities, as delineated above.

Note also that a virtual device may use one physical device in emulation mode and another physical device in pass-through mode. That is, to actually make a network connection, for example, a virtual NIC still relies on a physical NIC. The virtual NIC may utilize one physical NIC in pass-through mode and a different physical NIC in emulation mode.

Hardware can be designed to match the hardware supported by the software emulation. The decision about which backend to use for a particular virtual device at any instance is made outside of the VM by a VM hypervisor. In some realizations, software running inside a VM, including a device driver driving a particular virtual device, does not need to be aware of which backend is in use at a particular time. Furthermore, in some realizations, the hypervisor can switch the backend at any point in time, without the VM's software knowing about the switch, and without depending on the cooperation of software running inside the VM. The process of switching between different backends involves synchronizing the state of the current backend, saving it, restoring it into a second backend, and then resuming operations.

When a VM is running on a physical server machine where the hardware implementation is available, the hardware implementation can be used to provide the virtual device functionality. The same VM can be moved, either via cold migration, suspend/resume (warm migration) or VMotion™ by VMware, Inc. of Palo Alto, Calif. (hot migration), to a physical server machine that does not have a hardware implementation available, where the virtual device is implemented completely by software emulation only.

To avoid the need for different device drivers for each type of physical device or VF that might be encountered, according to one or more embodiments of the present invention, a certain level of uniformity may be mandated in a NIC's hardware interface. With appropriately designed device hardware and device emulation, both hardware and emulation can share the same design for performance critical functionalities that are visible to VM 300B and the guest software, to make the switch between backends (from emulation to pass-through, and vice versa) transparent to guests (or as transparent as possible). Requirements that may be placed on the design of a physical device to achieve the desired level of uniformity are implementation-specific. For a physical NIC, such requirements may include, for example, that the physical NIC hardware supports multiple VFs as defined by the PCI SIG (Special Interest Group) IOV (I/O Virtualization) Working Group. The requirements may also include that each VF has a pass-through memory-mapped I/O region that contains only the registers used for virtual NIC pass-through operations, where the registers can be accessed directly by the appropriate guest device driver 324B. The requirements may also include that the physical NIC supports MSI-X (Messaged Signal Interrupts) and that each VF has its own interrupt vector or set of interrupt vectors. The relatively standardized physical NIC just described may be used for pass-through, while any physical NIC may be used for emulation—that is, as described above, a virtual NIC may use one physical device (any physical NIC) for emulation and the more uniform physical NIC for pass-through.

One or more embodiments of the present invention do not disrupt and in fact may enhance VM migration including VMotion™. By appropriately designing device hardware and device emulation in a more uniform fashion as described above, the amount of I/O changes that are visible to guest software can be reduced, and VM migration can be made more transparent. Moreover, if VM 300B is moved to a physical server machine that does not have a particular hardware device available, the virtual device can be implemented completely by software emulation only. In other words, if pass-through is not available because the hardware device on the new physical server machine is not compatible with any of the available guest device drivers 324B, then emulation is always available as a fallback. Because, except for certain performance considerations, pass-through and emulation are effectively equivalent, reliance only on emulation would still be sufficient.

Figure 5:
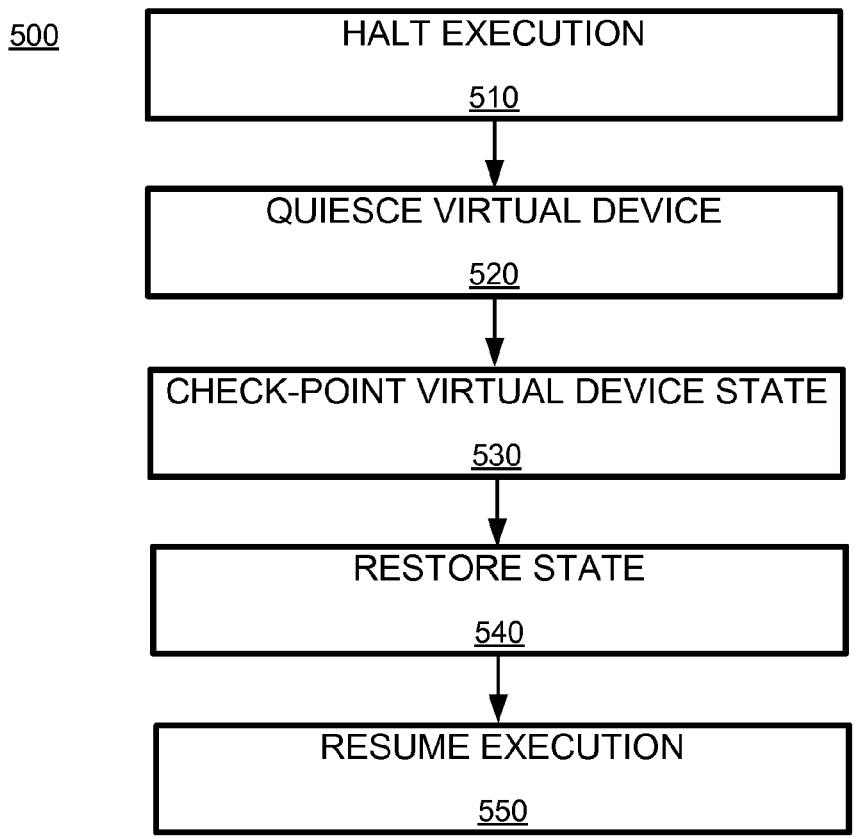
FIG. 5 is a flowchart 500 illustrating VM migration according to one or more embodiments of the present invention.

FIG. 5 is a flowchart 500 showing steps that are generally performed for VM migration according to one embodiment of the present invention. For simplicity of discussion, flowchart 500 is described for a single virtual device although in actual practice there may be more than one virtual device. As noted above, the device may be a NIC; however, embodiments of the present invention are not so limited. Generally speaking, embodiments described herein are applicable to any type of device that can be emulated and check-pointed.

At step 510, execution of the VM is halted. At step 520, the virtual device backend is instructed to quiesce at an appropriate point or boundary where a device check-point can be made. In one embodiment, this is operation is initiated by the hypervisor. The hypervisor then waits until the device is fully quiesced, either by periodically polling some status bits, or via some interrupt or event signaling mechanism. Note that step 520 applies to both fully software-emulated device backends and pass-through device backends.

At step 530, the state of the virtual device is check-pointed—the state of the device is saved so that it can be subsequently restored. In general, any state information that is changeable (e.g., time-dependent) and relevant to device operation is check-pointed. In emulation mode, state information is readily available for check-pointing. In pass-through mode, state information can be retrieved from dedicated registers, as discussed above. Some devices include state maintained in guest system memory 340B, which is inherently part of a VM's migration state.

At step 540, the check-pointed state is restored on a different backend. That is, another virtual device is initialized with the check-pointed state, after which the device can resume operations. This could be a fully software-emulated device backend or a pass-through device backend. Furthermore, the restoration may happen on a different physical server machine from the physical server on which the check-point operation at step 530 was done. Note that device check-point and restore can occur between any combinations of backends.

In some embodiments, after the check-pointed information is restored, from the point of view of the guest software, the device state looks the same as it did at the start of check-pointing (step 530). In some embodiments, the guest software cannot tell that the sequence of steps 520, 530 and 540 has occurred—that is, the switching of the backend is completely transparent to the guest software.

At step 550, execution of the VM is resumed.

In summary, embodiments in accordance with the present invention provide the high performance associated with pass-through operation, preserve VM mobility, provide a uniform interface for critical or frequent operations that preserves the hardware independence of VMs, and support check-pointing and restoration of state.

In one or more embodiments, programming instructions for executing above described methods and systems are provided. The programming instructions are stored in a computer readable media.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the invention relate to providing limited, direct access to a physical device from within a computing environment that is at least partially virtualized. Embodiments of the invention may be implemented in a wide variety of physical computer systems, having a wide variety of hardware platforms and configurations, and a wide variety of software platforms and configurations, including but not limited to personal computers, servers, application-specific, and embedded computer systems, which may be found in digital devices such as but not limited to mobile phones, smart phones, and digital media/entertainment devices. One or more embodiments may also be implemented in computer systems having varying degrees and/or types of virtualization, including fully virtualized computer systems, so-called para-virtualized computer systems, and a wide variety of other types of virtual computer systems, including virtual computer systems in which a virtualized hardware platform is either substantially the same as or substantially different from the underlying physical hardware platform. Embodiments of the invention may also be implemented to provide limited, direct access to a wide variety of physical devices that may interface with a physical computer system in a variety of ways.

One or more embodiments of the invention are described above merely to provide examples of how various embodiments of the invention can be implemented. A person of skill in the art will understand, based on the teachings above, how to various embodiments of the invention in a wide variety of other ways, to provide access to a wide variety of physical devices, in a wide variety of computer systems. Thus, exemplary implementations are described in terms of one or more specific physical computer systems, having specific hardware platforms and configurations, and specific software platforms and configurations, although embodiments of the invention may also be implemented in a wide variety of other physical computer systems. The exemplary implementations are also described in terms of specific virtual computer systems implemented within the physical computer systems, although embodiments of the invention may also be implemented in connection with a wide variety of other virtual computer systems. The exemplary implementations are also described in terms of specific physical devices. In particular, the exemplary implementations involve SCSI (Small Computer System Interface) HBA (host bus adapter) cards interfacing to PCI (Peripheral Component Interconnect) buses for providing VMs with direct access to SCSI device/HBAs. The exemplary implementations also involve network interface controllers (NIC). However, embodiments of the invention may be implemented in connection with a wide variety of other physical devices. For example, embodiments of the invention may be implemented in connection with different physical devices that also interface to PCI buses, but that implement different functions, such as a fiber channel HBA, for example. Alternatively, embodiments of the invention may be implemented in connection with physical devices that interface with different types of bus, or that interface with physical computer systems in some other way, and that implement any of a variety of functions.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Disc), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. In a virtualized computer system, a virtual device emulated in software and included in a virtual machine, the virtual device comprising:
    a logic to provide an emulation mode for accessing a physical Input/Output (I/O) device in a host where the virtual machine is executing, wherein the emulation mode is defined to be used for a first plurality of device operations;
    a logic to provide a pass-through mode for accessing the physical I/O device, wherein the pass-through mode is defined to be used for a second plurality of device operations different from the first plurality of device operations, each of the second plurality of device operations configured to be handled by the physical device via direct access from the virtual machine to the physical device; and
    a switching logic to switch between the emulation mode and the pass-through mode based on whether a device operation to be performed by the virtual machine on the virtual device belongs to the first plurality or the second plurality of device operations.

2. The virtual device as recited in claim 1, wherein the virtual device is capable of handling the first plurality of device operations and the second plurality of device operations in the emulation mode.

3. The virtual device as recited in claim 1, wherein the virtual device is capable of handling the first plurality of device operations and the second plurality of device operations in the pass-through mode.

4. The virtual device as recited in claim 1, wherein the emulation mode is configured to be used when the physical device is incompatible with the virtual device.

5. A method of handling operations of a virtual device in a virtual machine, the virtual machine executing in a virtualized computer system, the method comprising:
    receiving a device operation for processing by the virtual device, wherein the virtual device includes an emulation mode for handling a first plurality of device operations for a first physical device in a host where the virtual machine is executing, the virtual device further including a pass-through mode for handling a second plurality of device operations for the first physical device in the host via direct access from the virtual machine to the first physical device; and
    switching between the emulation mode and the pass-through mode based on whether the received device operation belongs to the first plurality or the second plurality of device operations,
    wherein the emulation mode of the virtual device is performed by software.

6. The method as recited in claim 5, wherein the first plurality of device operations include infrequent device operations.

7. The method as recited in claim 5, wherein the second plurality of device operations includes at least one of frequent device operations or performance critical device operations.

8. The method as recited in claim 5, wherein the virtual device is capable of handling the first plurality of device operations and the second plurality of device operations in the emulation mode.

9. The method as recited in claim 5, wherein the virtual device is capable of handling the first plurality of device operations and the second plurality of device operations in the pass-through mode.

10. The method as recited in claim 5, wherein the virtual device is further configured to communicate with a second physical device, wherein the second plurality of operations is passed on to the second physical device for handling in the pass-through mode when the first physical device is unavailable.

11. The method as recited in claim 5, further including:
switching to the emulation mode for all device operations when no physical device is available for pass-through mode.

12. A non-transitory computer readable media to store programming instructions for providing a virtual machine in a virtualized computer system with a virtual device, the non-transitory computer readable media comprising:
programming instructions for receiving a device operation for processing by the virtual device, wherein the virtual device includes an emulation mode for handling a first plurality of device operations for a first physical device in a host where the virtual machine is executing, the virtual device further including a pass-through mode for handling a second plurality of device operations for the first physical device in the host via direct access from the virtual machine to the first physical device; and
programming instructions for switching between the emulation mode and the pass-through mode based on whether the received device operation belongs to the first plurality or the second plurality of device operations.

13. The non-transitory computer readable media as recited in claim 12, further including:
programming instructions for enabling a communication between the virtual device and the physical device.

14. The non-transitory computer readable media as recited in claim 13, further including:
programming instructions for passing a device operation from the second plurality of operations from the virtual device to the physical device when the virtual device is operating in the pass-through mode.

15. The non-transitory computer readable media as recited in claim 12, wherein the virtual device is capable of handling the first plurality of device operations and the second plurality of device operations in the emulation mode.

16. The non-transitory computer readable media as recited in claim 12, wherein the virtual device is capable of handling the first plurality of device operations and the second plurality of device operations in the pass-through mode.

17. The non-transitory computer readable media as recited in claim 12, wherein the virtual device is further configured to communicate with a second physical device, wherein the second plurality of operations is passed on to the second physical device for handling in the pass-through mode when the first physical device is unavailable.

18. The non-transitory computer readable media as recited in claim 12, further including:
programming instructions for switching to the emulation mode for all device operations when no physical device is available for pass-through mode.

* * * * *